UNITED STATES PATENT OFFICE.

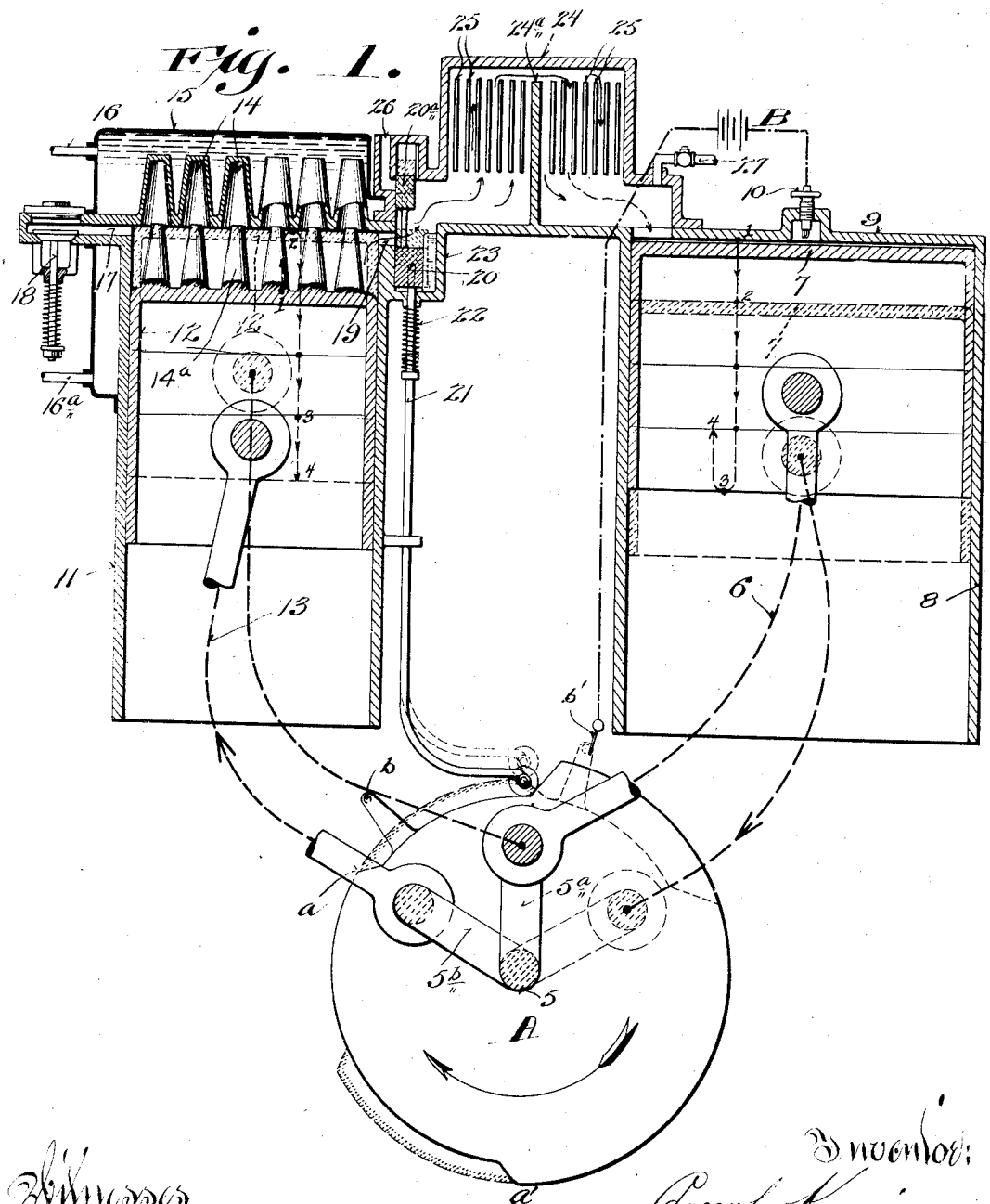

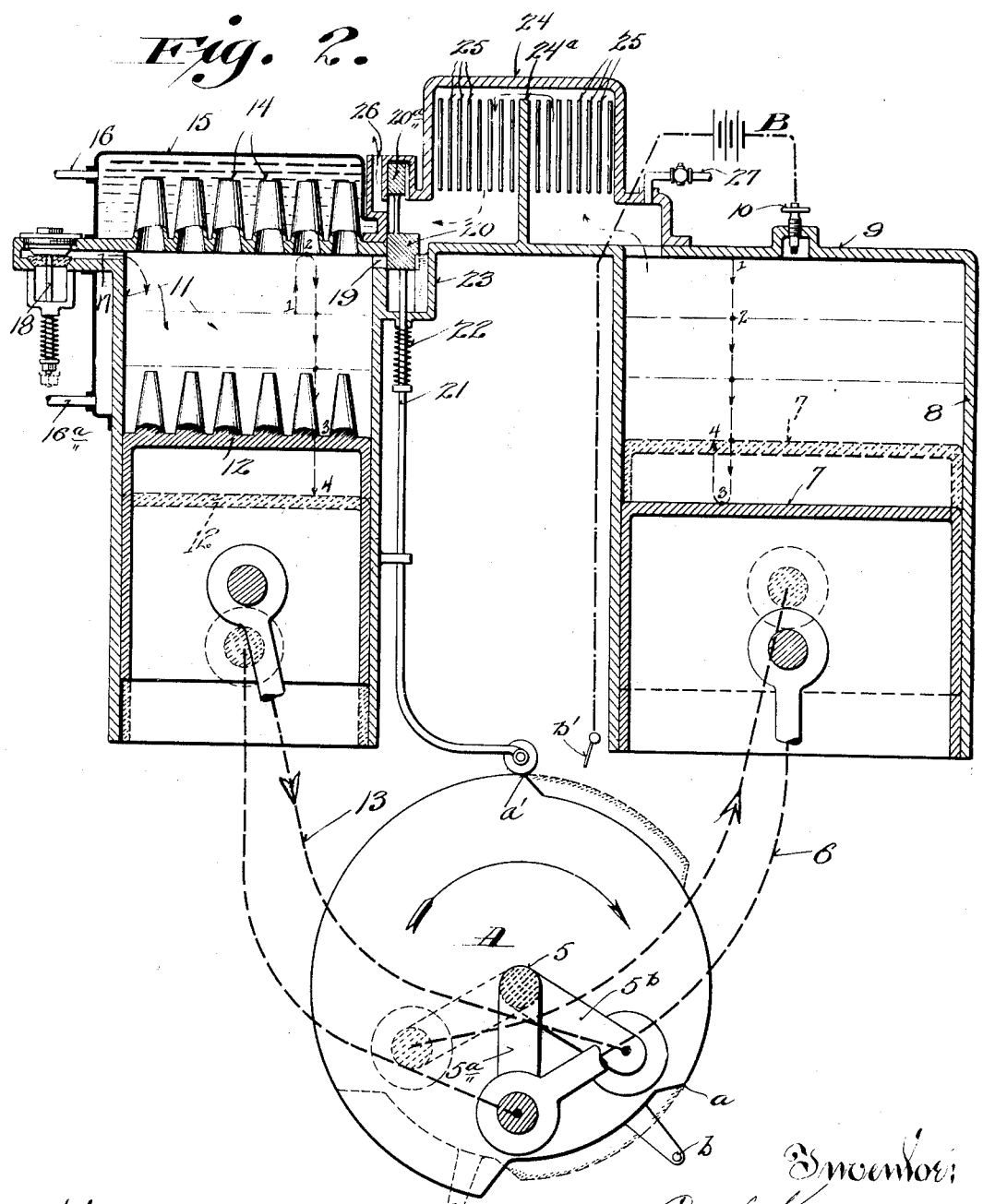

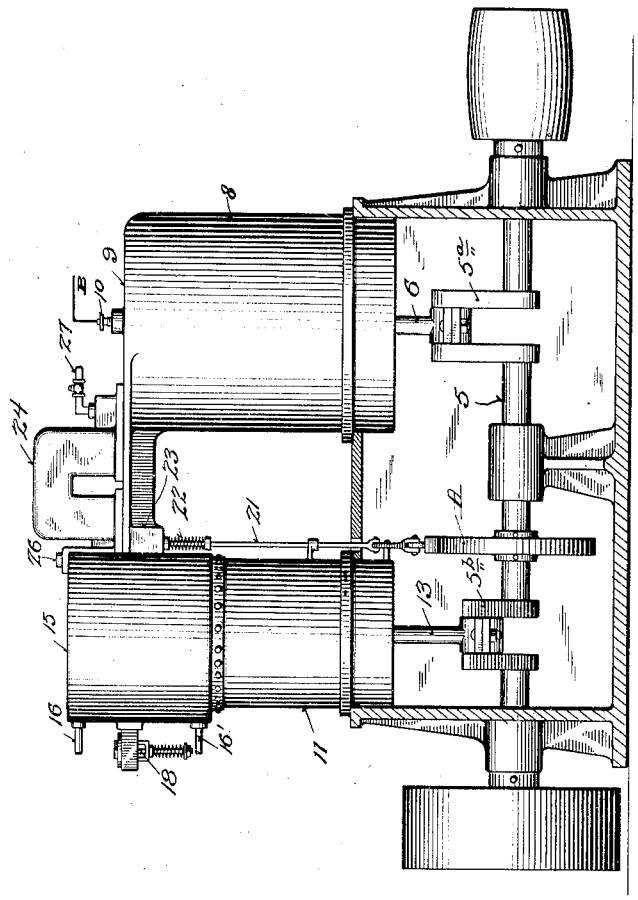

JOSEPH KOENIG, OF TWO RIVERS, WISCONSIN.

INTERNAL-COMBUSTION ENGINE.

1,111,841. Specification of Letters Patent. Patented Sept. 29, 1914.

Application filed March 7, 1911. Serial No. 612,878.

*To all whom it may concern:*

Be it known that I, JOSEPH KOENIG, a citizen of the United States, and resident of Two Rivers, in the county of Manitowoc and State of Wisconsin, have invented certain new and useful Improvements in Internal-Combustion Engines; and I do hereby declare that the following is a full, clear, and exact description thereof.

My invention refers to internal combustion engines of the compression type, its object being to provide simple, economical and efficient two-cycle engines of the above character, whereby a material reduction of fuel consumption in proportion to its developed H. P. will result. The above result is preferably accomplished through the employment of suitably cooled compressors one of which is provided for each cylinder of the engine. The head of each compressor and an engine cylinder are connected by a thermal chamber through which alternate charges of compressed air and spent gases are forced by the respective pistons, the compressor being provided with a valve-controlled fluid-intake port and a discharge port under time control that communicates with the thermal chamber, which chamber is also provided with a valve controlled exhaust port for the spent gases that are discharged from the engine cylinder through the thermal chamber upon the exhaust stroke of said engine piston. Thus alternate charges of cold compressed air and hot spent gases are passed in reverse directions through the thermal chamber, each charge of cold air being heated and expanded by absorbing the heat which is given off from the thermal chamber, which heat was previously absorbed by said chamber from a preceding volume of hot gases, the same being exhausted through said chamber from the engine cylinder.

While I have illustrated a set of reciprocative valves for controlling discharge of air from the compressor and also for exhausting spent gases from the thermal chamber, it should be understood that rotary valves may be substituted therefor without departing from the spirit of my invention.

Thus the essential features of my invention are to admit air or a mixture of air and gas into a cold compressor, compress the same in said cold cylinder whereby an initial maximum pressure is obtained with the least expenditure of power due to the tendency of the cold cylinder to neutralize heat that is generated by compression resulting in back pressure due to expansion and the necessary added power to overcome such back pressure.

The second necessary step is to release the cold compressed fluid from the compression cylinder by suitable valve mechanism and thereafter force the compressed air through the thermal chamber at the finish of the stroke of the compressor cylinder, the air being heated and confined within the chamber and between the engine cylinder head and its piston. Further compression will result incidental to the air being heated as it is shifted to the hot explosive end of the engine cylinder, the piston of which, starting on its outward stroke, receives the force of the explosion of the air or fluid which has either received a charge of oil or gas before entering the compression cylinder or after it is shifted to the explosive head of the engine cylinder. The efficiency of the engine will thereby be increased due to the maximum compression of fluid.

With the above objects in view my invention consists in what is herein shown, described and claimed.

In the drawings Figure 1 represents a diagram of an engine embodying the features of my invention, for clearness and simplicity in illustration an end view of the crank-shaft being shown in place of a longitudinal view of the same, which it is understood would be correct relative to the position of the cylinders. A second position of the pistons being illustrated in dotted lines, together with the relative position of the valves; Fig. 2, a similar diagram illustrating a third position of the mechanism in full and a fourth position in dotted lines, the four positions of the two diagrams showing a complete cycle of the engine, and Fig. 3, a side elevation with parts in section of a conventional engine embodying the features of my invention.

Referring by characters to the drawings, 5 represents a crank-shaft provided with a crank 5ª that is connected by a link 6 to an engine piston 7, which piston is reciprocatively mounted in a cylinder 8, the head 9 of the same being equipped with a spark-plug 10. The above described mechanism forms no part of my invention, being of standard type.

Spaced from the engine cylinder and parallel thereto is a compression cylinder 11 provided with a reciprocative piston 12 that is connected by a link 13 to a second crank 5ᵇ of the engine crank-shaft 5. These cranks are disposed upon different radial lines relative to the crank-shaft axis and within 45° of each other, the engine crank 5ᵃ being in advance of the compressor crank relative to the direction of rotation as indicated by the arrow. Thus the engine piston is, as shown, approximately one-quarter of its stroke in advance of the compressor piston.

The head of the compression cylinder is provided with a series of radiation thimbles 14 which are incased in a cooling jacket 15 that is provided with water circulating pipes 16, 16ᵃ, whereby the end of the cylinder is kept at a low temperature, the specific cooling medium illustrated, however, forms no part of my invention as any form of cooling apparatus may be employed as a substitute therefor. The compressor piston head is provided with a series of spurs 14ᵃ that are adapted to nest within the thimbles 14 when the piston has reached the limit of its compression stroke, thus displacing all fluid that may be contained in the head of the cylinder, the thimbles and spurs serving to increase the cooling areas of these members.

The head of the compression cylinder is provided with a fluid intake port 17 under control of a puppet valve 18 and a discharge port 19 that is controlled by a slide valve 20, the stem 21 of which in this instance is shown provided with a spring 22 that serves to hold the valve open in opposition to a cam-wheel A that is engaged by an antifriction roller carrier by the valve stem, said cam being secured to the crank-shaft. It should be understood that valve 20 is slidably mounted in a housing 23 that extends from the compression cylinder. A thermal chamber 24 connects the heads of the compression and engine cylinders, the ends of the same being in communication with said engine cylinder and discharge port 19 of the compressor cylinder.

For clearness in illustration the thermal chamber is provided with an intermediate vertical wall that extends from its bottom to a point slightly below the top, whereby a passage is formed therebetween. The space upon opposite sides of the partition 24ᵃ is provided with thermal bodies or plates 25. It should be understood that the construction and arrangement of the thermal chamber may be varied indefinitely without departing from the spirit of my invention, the essential feature being the provision whereby ample heat-absorbing surface is had. The thermal chamber is provided with an exhaust port 26 that is disposed at the air intake end of said chamber or in juxtaposition to the compressor cylinder, which port is controlled by a slide valve 20ᵃ that, in this instance, is shown connected to or forming a part of the valve 20 that controls the compressor discharge port. An oil or gas supply pipe 27 is connected to that end of the thermal chamber which communicates with the engine cylinder head, whereby air admitted from the compressor to the engine cylinder is suitably carbureted for fuel purposes, it being apparent, however, that, in some instances, air mixed with oil or gas may be admitted to the compressor cylinder through the intake port.

Referring to the position of the pistons in full lines Fig. 1, the compressor piston has completed three-quarters of its compression stroke, while the engine piston has completed its exhaust stroke and all of the valve ports are closed with the exception of the compressor discharge port which opened just as the compressor piston reached the position shown. A partial rotation of the crank-shaft in the direction indicated by the arrow sufficient to bring the compressor crank 5ᵃ to its highest point will cause the air which has been previously compressed between the head of the compressor cylinder and its piston to be entirely expelled therefrom. The cold air thus expelled passes through the thermal chamber and between its plates, being shifted to the head end of the engine cylinder. The air is thereby heated to the desired temperature by absorbing heat radiating from the thermal chamber plates and incidental to the shift of air the engine piston completes one-quarter of its downward stroke. Thus the heated air receives no mechanical compression in its shift from one cylinder to the other, but its expansive force is increased due to the heat. Simultaneous with the completion of the movements of the pistons just described the discharge port 19 is closed by valve 20 due to the roller of the valve stem 21 being lifted by the high face $a$ of cam-wheel A. The heated air also receives a charge of oil or gas through supply pipe and coincident to closing of the compressor discharge port the fuel mixture is exploded by the closure of an electric circuit B which is established through a pin $b$ of the cam-wheel that engages a contact plate $b'$ of the battery circuit B, the said circuit being grounded in any suitable manner through the cam.

As shown in the diagram in Fig. 2, the engine piston completes its working stroke and assumes the position shown in full lines in said figure. In this position the engine crank 5ᵃ is at its low point and the compression cylinder is still upon its suction stroke, puppet valve 18 being open and the discharge port 19 closed. The exhaust port 26, however, is now open due to engagement of the valve stem roller with a second high face $a'$ of the cam. This further upward movement of valve 20 having no effect upon the discharge port of the compressor due to a lap of said valve, there being also sufficient lap upon valve 20ª which controls the exhaust port to prevent same from opening when the first movement of valve 20 to close the discharge port takes place.

The fourth position, as illustrated by dotted lines in Fig. 2, shows the engine cylinder upon its exhaust stroke having traveled one-quarter of the movement, the compression cylinder at this time having completed its downward or suction stroke.

The compression piston now starts upon its compression stroke, the intake port being closed by the puppet valve and the engine cylinder thus completes its exhaust stroke and the cylinders again assume the position shown in Fig. 1, the spent gases from the engine cylinder having all been expelled therefrom through the thermal chamber to atmosphere from the exhaust port 26, which exhaust port is then closed while the discharge port of the compressor is open incidental to a drop of the valve stem roller from the highest surface of the cam to its lowest surface, as shown in full lines in Fig. 1. Thus it will be seen that the desired amount of heat will be absorbed by the plates within the thermal chamber due to travel of the hot spent gases thereover upon the exhaust stroke of the engine piston, the surface area of these plates being sufficient to absorb the proper amount of heat.

In practice it is preferable, as shown, to provide a compression cylinder of less area than that of the engine cylinder for purposes of economy, the area being thus reduced the power required for compressing the charge is relatively less. Thus a small charge under high pressure in said compression cylinder is of sufficient volume to supply a full charge to the engine cylinder of greater area.

In connection with the foregoing description the following essential features should be borne in mind: First; that the working cylinder is maintained at a high temperature relative to the compression cylinder, this being accomplished by providing the latter with a cooling jacket of greater area relative to the surface area of the cylinder to which the jacket is directly applied. Second; that the cooled air or fuel charge admitted to the compression cylinder is reduced in its volume to approximately one quarter of its original volume by compression incidental to three quarters of the piston stroke, the cylinder valves being closed during this compression operation. Third; that the last quarter of the piston stroke is utilized to shift the cold compressed air through a valve-controlled port and thermal chamber to the head of the engine cylinder while its piston is moving downward upon the first quarter of its stroke. Fourth; that the cold air or fluid charge, in passing from the compressor cylinder to the engine cylinder, is heated and by suitable valve mechanism confined in the chamber and head end of the cylinder and the heat taken up by the confined air thus causes expansion thereof, which expansion is exerted directly upon the working piston head prior to an explosion of the fuel charge. Fifth; that the spent gases are entirely expelled through a suitably arranged valve-controlled exhaust port from the engine cylinder and chamber by the full exhaust stroke of the engine piston, whereby the spent gases are not commingled with the succeeding cold air charge that is being compressed in a separate cylinder simultaneously with the exhaust of said gases, which gases heat the chamber in their passage to exhaust by traveling over suitably arranged thermal bodies in said chamber. Sixth; that the stored heat is taken up by the next charge of cold fluid to raise its temperature to the desired degree preparatory to its being exploded over the head of the engine piston.

I claim:

1. In an internal combustion engine having a piston, and a cylinder therefor; the combination of a fluid compression cylinder having a discharge port, and a valve-controlled intake port, a piston mounted in the compression cylinder, a thermal chamber in communication with the compression cylinder discharge port and head end of said engine cylinder, the chamber being provided with an exhaust port in juxtaposition to the compression cylinder, valves for said compression cylinder discharge port and chamber exhaust port, and positive means for actuating the valves successively, whereby the compression cylinder discharge port is held closed during the major part of the working stroke of its piston and the chamber exhaust port is open during the exhaust stroke of the working piston.

2. In an internal combustion engine having a piston, and a cylinder therefor; the combination of a fluid compression cylinder having a discharge port, and a valve-controlled intake port, a piston mounted in the compression cylinder, a thermal chamber in communication with the compression cylinder discharge port and head end of said engine cylinder, the chamber being provided with an exhaust port in juxtaposition to the compression cylinder, a plurality of thermal plates located in the chamber in spaced relation to each other, valves for said compression cylinder discharge port and chamber exhaust port, and positive means for actuating the valves successively, whereby the compression cylinder discharge port is held closed during the major part of the working stroke of its piston and the chamber exhaust port is open during the exhaust stroke of the working piston.

3. In an internal combustion engine having a piston, and a cylinder therefor; the combination of a fluid compression cylinder having a discharge port, and a valve-controlled intake port, a piston mounted in the compression cylinder, a thermal chamber in communication with the compression cylinder discharge port and head end of said engine cylinder, the chamber being provided with an exhaust port in juxtaposition to the compression cylinder, valves for said compression cylinder discharge port and chamber exhaust port, and a single positive means for successively actuating both valves, whereby the compression cylinder discharge port is held closed during the major part of the working stroke of its piston and the chamber exhaust port is open during the exhaust stroke of the working piston.

4. In an internal combustion engine having a piston, and a cylinder therefor; the combination of a fluid compression cylinder having a discharge port, and a valve-controlled intake port, a piston mounted in the compression cylinder, a thermal chamber in communication with the compression cylinder discharge port and head end of said engine cylinder, the chamber being provided with an exhaust port that is disposed adjacent to the air intake end of said chamber, valves for said compression cylinder discharge port and chamber exhaust port, and positive means for actuating the valves successively, whereby the compression cylinder discharge port is held closed during the major part of the working stroke of its piston and the chamber exhaust port is open during the exhaust stroke of the working piston.

5. An internal combustion engine comprising a working cylinder, a piston therefor, a fluid cooled fluid compression cylinder having a discharge port, and a valve-controlled intake port, the compression cylinder being of lesser area than the engine cylinder, a piston for the compression cylinder, a thermal chamber in communication with the compression cylinder discharge port and head end of said engine cylinder, the chamber being provided with an exhaust port disposed adjacent to its air intake end, valves for said compression cylinder discharge port and chamber exhaust port, and positive means for actuating the valves whereby the compression cylinder discharge port is held closed during the major portion of the working stroke of its piston, and the chamber exhaust port is opened during the exhaust stroke of the working piston.

In testimony that I claim the foregoing I have hereunto set my hand at Two Rivers in the county of Manitowoc and State of Wisconsin in the presence of two witnesses.

JOSEPH KOENIG.

Witnesses:
G. A. MAYER,
MARCELLA J. GAFFNEY.

---

Copies of this patent may be obtained for five cents each, by addressing the "Commissioner of Patents, Washington, D. C."